United States Patent
Tanaka et al.

(10) Patent No.: US 12,092,134 B2
(45) Date of Patent: Sep. 17, 2024

(54) INFLATABLE STRUCTURE WITH REINFORCEMENT SHAPED ACCORDING TO A TURING PATTERN

(71) Applicant: Toyota Motor Engineering & Manufacturing North America, Inc., Plano, TX (US)

(72) Inventors: Masato Tanaka, Ann Arbor, MI (US); Yuyang Song, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 86 days.

(21) Appl. No.: 18/086,305

(22) Filed: Dec. 21, 2022

(65) Prior Publication Data

US 2024/0209877 A1 Jun. 27, 2024

(51) Int. Cl.
| | | |
|---|---|---|
| *F15B 15/10* | (2006.01) | |
| *A47C 27/08* | (2006.01) | |
| *B32B 3/08* | (2006.01) | |
| *B32B 3/10* | (2006.01) | |
| *B32B 5/02* | (2006.01) | |

(Continued)

(52) U.S. Cl.
CPC .......... *F15B 15/103* (2013.01); *A47C 27/081* (2013.01); *B32B 3/085* (2013.01); *B32B 3/10* (2013.01); *B32B 5/02* (2013.01); *B32B 5/26* (2013.01); *B32B 27/08* (2013.01);
(Continued)

(58) Field of Classification Search
CPC .............................. F15B 15/10; F15B 15/103
See application file for complete search history.

(56) References Cited

U.S. PATENT DOCUMENTS 9,624,911 B1 4/2017 Griffith et al.
9,777,753 B2 * 10/2017 Niiyama ............... F15B 15/103
(Continued)

FOREIGN PATENT DOCUMENTS

WO 2015157621 A1 10/2015

OTHER PUBLICATIONS

Miron et al. "Sleeved Bending Actuators for Soft Grippers: A Durable Solution for High Force-to-Weight Applications," Actuators 7(3), 40, Jul. 17, 2018 (16 pages).
(Continued)

*Primary Examiner* — Michael Leslie
(74) *Attorney, Agent, or Firm* — Christopher G. Darrow; Darrow Mustafa PC

(57) ABSTRACT

An inflatable includes an inflation chamber. The inflation chamber has an outer surface, a first end, and a second end substantially opposite the first end. The inflation chamber is configured to be inflated from a deflated state to an inflated state. The inflation chamber is loadable and bendable in the inflated state. The inflatable also includes a reinforcement. The reinforcement has reinforcement sections corresponding to high-stress regions of the outer surface when the inflation chamber is in the inflated state. The reinforcement is attached to the outer surface and is configured to improve at least one of a loading strength and a bending capability of the inflation chamber when the reinforcement sections are placed on the high-stress regions of the outer surface. The reinforcement is shaped according to a Turing pattern that is based on the high-stress regions of the outer surface.

20 Claims, 7 Drawing Sheets

(51) Int. Cl.
    *B32B 5/26*   (2006.01)
    *B32B 27/08*  (2006.01)
    *B32B 27/12*  (2006.01)
(52) U.S. Cl.
    CPC ........... *B32B 27/12* (2013.01); *B32B 2307/54* (2013.01); *B32B 2479/00* (2013.01); *Y10T 137/3584* (2015.04)

(56) References Cited

U.S. PATENT DOCUMENTS

| | | | | |
|---|---|---|---|---|
| 10,189,165 | B2* | 1/2019 | Galloway | B25J 9/142 |
| 10,337,536 | B2 | 7/2019 | Niiyama et al. | |
| 10,639,801 | B2* | 5/2020 | Mosadegh | F15B 15/103 |
| 11,255,356 | B2* | 2/2022 | Sedal | F03G 7/0614 |
| 11,267,166 | B2 | 3/2022 | Nomura et al. | |
| 11,548,261 | B2* | 1/2023 | Gandhi | B32B 27/40 |
| 11,579,344 | B2* | 2/2023 | Josell | G02B 5/1861 |
| 11,725,635 | B1* | 8/2023 | Song | H02N 13/00 60/528 |
| 2014/0314976 | A1 | 10/2014 | Niiyama et al. | |
| 2019/0015233 | A1 | 1/2019 | Galloway et al. | |
| 2020/0361095 | A1 | 11/2020 | Nguyen et al. | |
| 2021/0031483 | A1* | 2/2021 | Nishine | B44F 1/02 |
| 2022/0207212 | A1* | 6/2022 | Brifault | G06F 30/12 |
| 2023/0079046 | A1* | 3/2023 | Lohan | G06F 30/28 703/1 |
| 2023/0088911 | A1 | 3/2023 | Song et al. | |
| 2023/0108120 | A1* | 4/2023 | Tanaka | G06F 30/10 703/1 |
| 2023/0114354 | A1* | 4/2023 | Garnier | G05B 19/4099 703/7 |

OTHER PUBLICATIONS

"Waveline Air Inflatable Bench XL," Apple Displays Account, https://www.appledisplays.com/shop/waveline-air-inflatable-bench-xl/ (2022).

"Premium Inflatable Bench Seat," Instant Promotion, https://www.instantpromotion.com/pre-inflatable-bench.html (2022).

Nguyen et al., "Design and Computational Modeling of Fabric Soft Pneumatic Actuators for Wearable Assistive Devices," Scientific Reports 10, Article No. 9638 (2020).

* cited by examiner

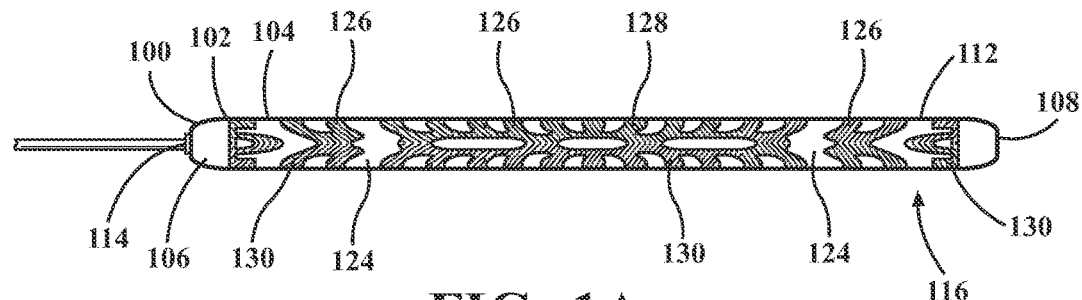
FIG. 1A
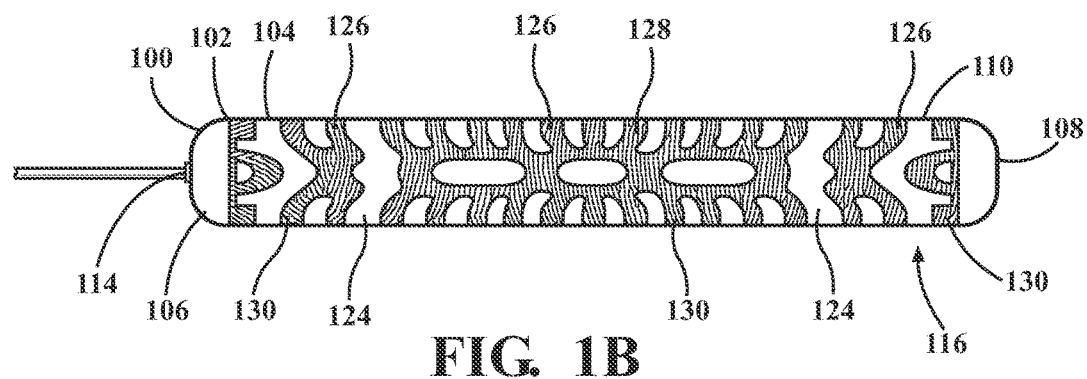
FIG. 1B
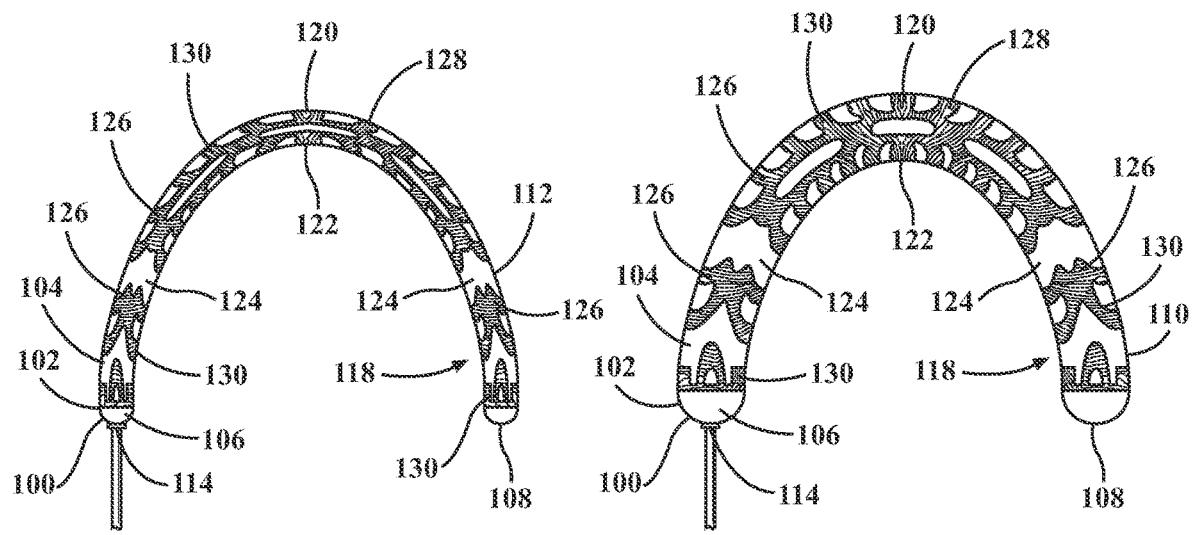
FIG. 1C
FIG. 1D

INFLATABLE STRUCTURE WITH REINFORCEMENT SHAPED ACCORDING TO A TURING PATTERN

TECHNICAL FIELD

The subject matter described herein relates, in general, to systems and methods for inflatable structures and, more specifically, to a reinforcement having a design based on a topology analysis of an outer surface of an inflatable structure, where the reinforcement alleviates high-stress regions in the outer surface, thereby improving a loading strength and/or a bending capability of the inflatable.

BACKGROUND

Inflatable structures may have a wide variety of applications. For example, inflatable structures can be used as soft actuators, airbags, etc. These inflatable structures may include internal baffles that create the shape of the inflatable structure as well as a fabric overlay to cover the internal baffles and retain the inflating fluid (e.g., air) within the structure. When used to support a load, the load-carrying capability of an inflatable structure may depend on the design of the internal baffles and the internal pressure of the structure. In order to support heavier loads, some inflatable structures need special fabrication skills, such as a special looming or weaving technique to increase the strength of the fabric overlay.

SUMMARY

This section generally summarizes the disclosure and is not a comprehensive explanation of its full scope or all its features.

In one embodiment, example systems and methods relate to an inflatable and a reinforcement for improving a loading strength and/or bending capability of the inflatable. As previously noted, inflatable structures may be used to support a load, and it may be advantageous to improve the load-carrying capability of the inflatable. Therefore, in one embodiment, an inflatable includes a reinforcement. The reinforcement is designed based on topology analysis of an outer surface of the inflatable. The outer surface may include high-stress regions identified through the topology analysis. The reinforcement includes reinforcement sections corresponding to the high-stress regions such that, when the reinforcement is attached to the outer surface, the reinforcement sections are placed on the high-stress regions, thereby alleviating the high-stress regions, and improving the loading strength and/or bending capability of the inflatable.

In one embodiment, an inflatable includes an inflation chamber. The inflation chamber has an elongated body and an outer surface. The inflation chamber is configured to be inflated from a deflated state to an inflated state. The inflation chamber is loadable and bendable in the inflated state. The inflatable also includes a reinforcement. The reinforcement has reinforcement sections corresponding to high-stress regions of the outer surface when the inflation chamber is in the inflated state. The reinforcement is attached to the outer surface. The reinforcement is configured to improve at least one of a loading strength and a bending capability of the inflation chamber when the reinforcement sections are placed on the high-stress regions of the outer surface. The reinforcement is shaped according to a Turing pattern that is based on the high-stress regions of the outer surface.

In another embodiment, an inflatable includes an inflation chamber. The inflation chamber has an elongated body and an outer surface. The inflation chamber is configured to be inflated from a deflated state to an inflated state. The inflation chamber is loadable and bendable in the inflated state. The inflatable also includes a fabric reinforcement attached to the outer surface. The fabric reinforcement is shaped according to a Turing pattern that is based on high-stress regions of the outer surface when the inflation chamber is in the inflated state. The reinforcement has reinforcement sections corresponding to the high-stress regions. The reinforcement is configured to improve at least one of a loading strength and a bending capability of the inflation chamber when the reinforcement sections are placed on the high-stress regions of the outer surface. The Turing pattern is based on topology analysis of the outer surface. The Turing pattern corresponds with an orientation and stiffness distribution of at least one material of the reinforcement sections such that the reinforcement alleviates stress in the high-stress regions.

In yet another embodiment, an inflatable includes an inflation chamber. The inflation chamber has an elongated body and an outer surface. The inflation chamber is configured to be inflated from a deflated state to an inflated state. The inflation chamber is loadable and bendable in the inflated state. The inflation chamber is bendable from a substantially unbent configuration to a generally bent configuration in which the inflatable forms a U-shape. In the bent configuration, the inflation chamber has a tensile side that is stretched and a compressive side that is compressed. The inflatable also includes a fabric reinforcement attached to the outer surface. The fabric reinforcement is shaped according to a Turing pattern that is based on high-stress regions of the outer surface when the inflation chamber is in the inflated state. The reinforcement has reinforcement sections corresponding to the high-stress regions. The reinforcement is configured to improve at least one of a loading strength and a bending capability of the inflation chamber when the reinforcement sections are placed on the high-stress regions of the outer surface. The Turing pattern is based on topology analysis of the outer surface. The Turing pattern corresponds with an orientation and stiffness distribution of at least one material of the reinforcement sections such that the reinforcement alleviates stress in the high-stress regions. The inflatable also includes a jamming element for at least one of the tensile side and the compressive side. The jamming element is configured to improve at least one of the loading strength and the bending capability of the inflation chamber.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1A illustrates an example of an inflatable in a deflated state and an unbent configuration.

FIG. 1B illustrates an example of the inflatable in an inflated state and an unbent configuration.

FIG. 1C illustrates an example of the inflatable in a deflated state and a bent configuration.

FIG. 1D illustrates an example of the inflatable in an inflated state and a bent configuration.

DETAILED DESCRIPTION

Figure 2A:
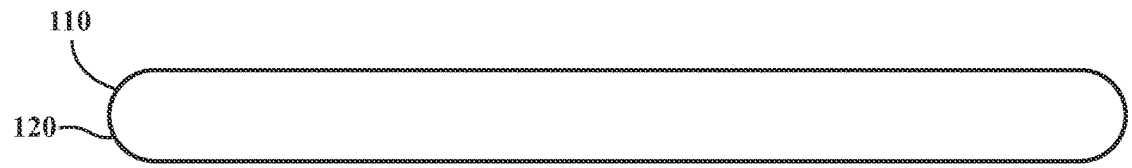
FIG. 2A illustrates an example of an inflation chamber of the inflatable without a reinforcement.

Systems, methods, and other embodiments associated with improving one or more characteristics of an inflatable are disclosed herein. In one or more arrangements, the inflatable has a tubular, elongated body that may be configured as an inflatable bench seat, a soft robotic arm, or another type of inflatable device that benefits from the noted improvements. As a general description, the inflatable has an outer surface, and when the inflatable is inflated, high-stress regions may be present in the outer surface. The presence of high-stress regions in the outer surface may cause the inflatable to be weakened when subjected to a load, such as from an object being placed thereon and/or when being bent. To improve how the inflatable handles stress, a disclosed approach involves identifying the locations of the high-stress regions through topology analysis of the outer surface. Accordingly, construction of the inflatable includes, in one or more arrangements, attachment of a reinforcement to the outer surface. In general, a form of the reinforcement is designed to alleviate the high-stress regions. In one or more arrangements, the reinforcement includes reinforcement sections corresponding to the high-stress regions, such that attaching the reinforcement to the outer surface alleviates stress within the high-stress regions, thus improving the loading strength and/or bending capability of the reinforcement.

Referring to FIGS. 1A-1D, an example of an inflatable 100 is shown. The inflatable 100 includes a reinforcement designed through topology analysis and configured to improve the loading strength and/or bending capability of the reinforcement. The inflatable 100 has an inflation chamber 102. In some arrangements, as shown, the inflatable 100 has an elongated body. The inflation chamber 102 has an outer surface 104, a first end 106, and a second end 108. The inflation chamber 102 is made from any suitable soft and flexible material. For example, the inflation chamber 102 is made from fabric or plastic. The elongated body can allow the inflatable 100 to be used as a bench seat for a person to sit on, as a soft robotic arm for grabbing items, or another type of elongated, bendable device.

In various configurations, the inflation chamber 102 provides for being inflated and deflated. Thus, the inflation chamber 102 has an inflated state 110 that is depicted in FIGS. 1B and 1D and a deflated state 112 that is depicted in FIGS. 1A and 1C. In the inflated state 110, the inflation chamber 102 is substantially full of fluid. In the inflated state 110, the inflation chamber 102 is substantially pressurized such that the inflatable 100 can support a load without significantly deforming under the load. The inflation chamber 102 can be inflated with a suitable fluid, for example, the inflation chamber 102 can be inflated with gas (e.g., air) or liquid. In the deflated state 112, the inflation chamber 102 is not substantially full of fluid. In other words, in the deflated state 112, the inflation chamber 102 contains no fluid or is partially full of fluid. When the inflation chamber 102 is partially full of fluid, the inflation chamber 102 is inflated but not to a state in which the inflation chamber 102 would be able to support a load. In the deflated state 112, the inflation chamber 102 is not substantially pressurized and the inflatable 100 may not be able to support a load. In the deflated state 112, the inflation chamber 102 is flexible and foldable such that the inflatable 100 is easily compacted for storage. The inflatable 100 includes an inflation port 114 fluidly connected to the inflation chamber 102 and connectable to an inflation pump, shown in FIG. 6. The inflation pump is operable to pump fluid into the inflation chamber 102 through the inflation port 114 to inflate the inflation chamber 102 and is also operable to pump fluid out of the inflation chamber 102 through the inflation port 114 to deflate the inflation chamber 102.

In some instances, the inflatable 100 is configured to be loaded by, for example, supporting one or more objects resting on the inflatable 100 when in the inflated state 110. Accordingly, the inflation chamber 102 has a loading strength. In some instances, the loading strength corresponds to an amount of weight that the inflatable 100 may be able to support without significant deformation or catastrophic deconstruction. Instances of significant deformation may include instances in which the inflatable 100 is not able to support a load or instances in which the inflatable 100 is able to support a load, but the load is not stably supported on the inflatable 100. In some instances, the inflatable 100 is also configured to be bendable. For example, the inflatable 100 is bendable from a substantially unbent configuration 116 as depicted in FIGS. 1A and 1B in which the inflatable 100 has a generally straight shape to a substantially bent configuration 118 (e.g., exceeding about 3 degrees) as depicted in FIGS. 1C and 1D in which the inflatable 100 forms a general U-shape. In the bent configuration 118, the inflatable 100 has a tensile side 120 and a compressive side 122. The tensile side 120 is a side of the inflatable 100 that is generally stretched when the inflatable 100 is in the bent configuration 118, and the compressive side 122 is a side of the inflatable 100 that is generally compressed when the inflatable 100 is in the bent configuration 118. Accordingly, the inflation chamber 102 has a bending capability. In some instances, the bending capability corresponds to the amount of bend that the inflatable 100 is configured for without damage to the inflatable 100, such as a kink in the inflatable 100 or a tear in the material of the inflatable 100.

In some instances, when the inflatable 100 is in the inflated state 110, low-stress regions 124 and high-stress regions 126 may be present in the outer surface 104. The presence of low-stress regions 124 and high-stress regions 126 in the outer surface 104 may be due to an uneven distribution of the internal pressure in the inflation chamber 102. The low-stress regions 124 may correspond to regions of the outer surface 104 where the inflation chamber 102 is not significantly stretched, stressed, compressed, or otherwise strained, while the high-stress regions 126 may correspond to regions of the outer surface 104 where the inflation chamber 102 is significantly stretched, stressed, compressed, or otherwise strained. In some instances, the presence of the high-stress regions 126 decreases the loading strength and/or the bending capability of the inflation chamber 102.

Accordingly, it may be advantageous to improve the loading strength and/or the bending capability of the inflation chamber 102. Therefore, in at least one configuration, the inflatable 100 includes a reinforcement 128. In one approach, the reinforcement 128 is attached to the outer surface 104. As shown, the reinforcement 128 includes reinforcement sections 130 corresponding to the high-stress regions 126. When the reinforcement 128 is attached to the outer surface 104, the reinforcement sections 130 are placed to correspond with the high-stress regions 126 such that the reinforcement 128 alleviates stress in the high-stress regions 126. In this way, the loading strength and/or bending capability of the inflation chamber 102 is improved. The reinforcement 128 is made of any suitable material (e.g., a reinforcement material), for example, the reinforcement 128 is made of fabric or plastic. In some instances, the reinforcement 128 is made of the same material as the inflation chamber 102. Moreover, in some instances, the reinforcement 128 can be made of multiple different materials. The reinforcement 128 can be attached to the outer surface 104 in any suitable manner, for example, the reinforcement 128 can be attached to the outer surface 104 by gluing, sewing, fabric-bonding, etc.

Figure 2B:
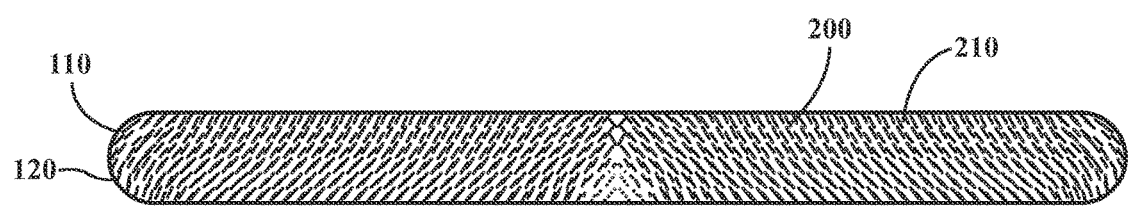
FIG. 2B illustrates an example of an orientation stiffness and distribution of an outer surface of the inflation chamber obtained using topology analysis.
Figure 2C:
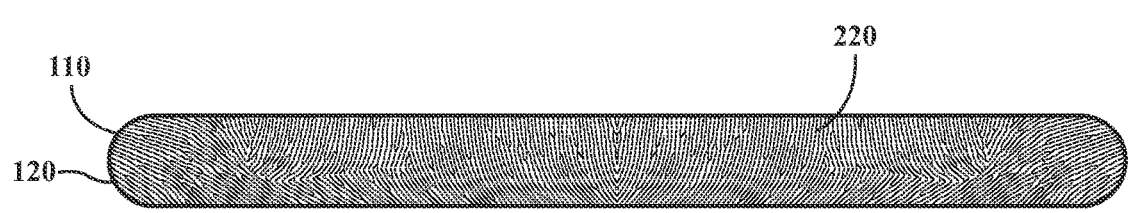
FIG. 2C illustrates an example of a space-filling Turing pattern generated based on the orientation and stiffness distribution.

The high-stress regions 126 may be identified via an analysis process that focuses on the outer surface 104. A computing device may perform the analysis process. In one example, the computing device identifies the high-stress regions 126 using topology analysis conducted on the outer surface 104. The computing device may conduct the topology analysis on the outer surface 104 when the inflatable 100 is in the inflated state 110, as the high-stress regions 126 may not be present in the outer surface 104 when the inflatable is in the deflated state 112. As shown in FIGS. 2A-2C, the computing device performs the topology analysis based on the outer surface 104 when the inflatable is in the unbent configuration 116, however, in other instances, the computing device performs the topology analysis based on the outer surface 104 when the inflatable is in the bent configuration 118.

Figure 2D:
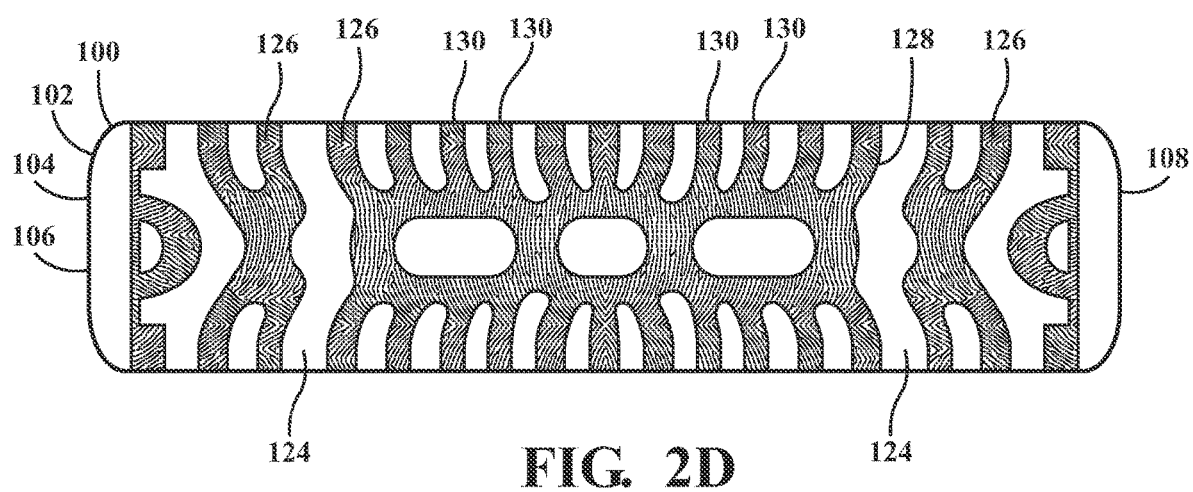
FIG. 2D illustrates an example of a reinforcement for the outer surface created based on the space-filling Turing pattern.

Referring now to FIG. 2A, an example of the inflation chamber 102 is shown. As shown in FIG. 2A, the inflation chamber 102 is in the unbent configuration 116 and the inflated state 110. The computing device can conduct the topology analysis on the outer surface 104 to obtain an optimal orientation and stiffness distribution 200 of the reinforcement 128 material. The orientation and stiffness distribution 200 indicates the orientation of the reinforcement sections 130 and the stiffness of the reinforcement material. An example of the orientation and stiffness distribution 200 is shown in FIG. 2B. As depicted, the orientation and stiffness distribution 200 includes orientation lines 210. The direction of each line indicates the orientation of the reinforcement 128 material, and the shading of each line indicates a stiffness value of the reinforcement 128 material. For example, a darker shading may indicate a stiffer material, while a lighter shading may indicate a softer material. Once the orientation and stiffness distribution 200 is obtained, in one approach, the computing device transforms the orientation and stiffness distribution 200 to a space-filling Turing pattern 220. FIG. 2C shows an example of a space-filling Turn pattern generated based on the orientation and stiffness distribution 200 of FIG. 2B. In one example, the computing device transforms the orientation and stiffness distribution 200 to a space-filling Turing pattern 220 using a simulation of a reaction-diffusion equation. In some instances, in the reaction-diffusion simulation, anisotropic elastic properties obtained from the topology analysis are regarded as anisotropic diffusion properties. In some instances, once the computing device solves the reaction-diffusion equation, the computing device automatically generates the space-filling Turing pattern 220. Moreover, in some instances, the computing device may change a pitch width of the Turing pattern 220 by controlling the parameters of the reaction-diffusion equation and using the orientation and stiffness distribution 200. Once the computing device generates the space-filling Turing pattern 220, the reinforcement 128 is created based on the Turing pattern 220. FIG. 2D shows an example of a reinforcement 128 that is shaped based on the Turing pattern 220 of FIG. 2C.

Figure 3:
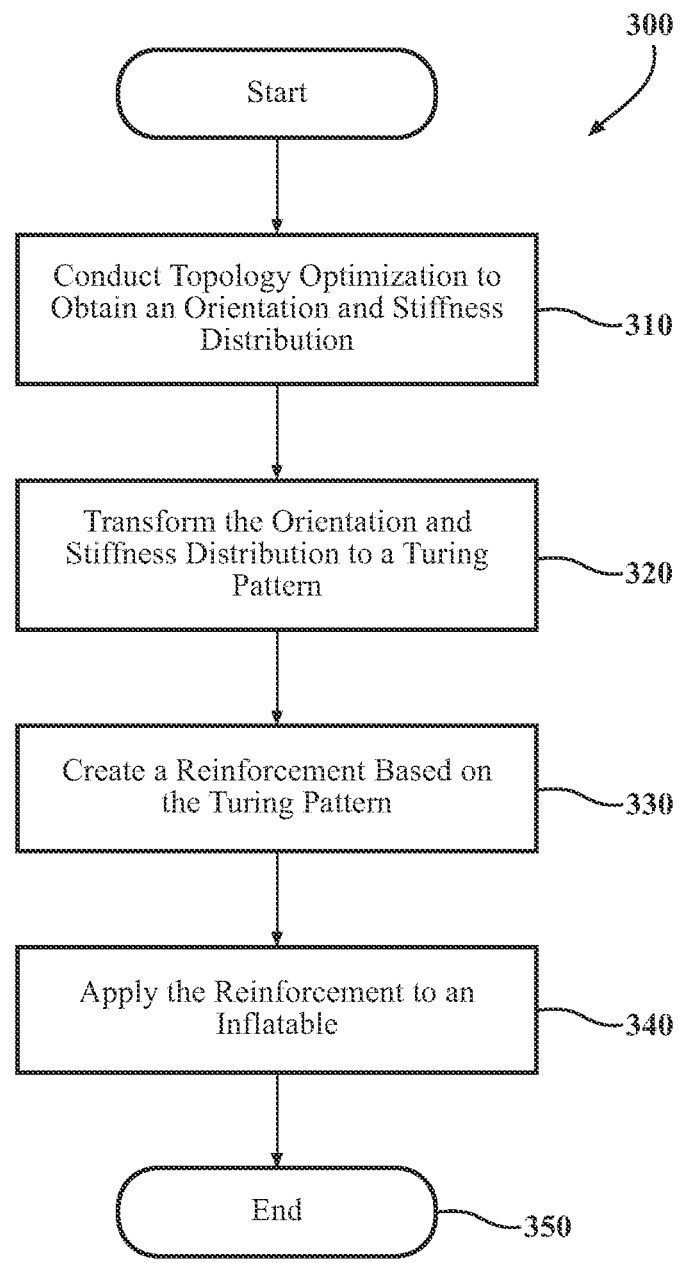
FIG. 3 illustrates a flowchart of a method of designing the reinforcement according to a Turing pattern.

Referring now to FIG. 3, an example method of designing a reinforcement 128 is shown. It should be understood that this is just one example of implementing the method 300. In one approach, the computing device described above in connection with FIGS. 2A-2D may perform the method 300. At step 310, in one approach, the computing device conducts topology analysis to obtain an orientation and stiffness distribution 200. As described above, in some instances, the computing device conducts the topology analysis on the outer surface 104 when the inflatable 100 is in the inflated state 110. The computing device can perform the topology analysis based on the outer surface 104 when the inflatable is in the unbent configuration 116, however, in other instances, the computing device performs the topology analysis based on the outer surface 104 when the inflatable is in the bent configuration 118. The orientation and stiffness distribution 200 indicates the orientation of the reinforcement sections 130 and the stiffness of the reinforcement 128 material.

At step 320, the computing device transforms the orientation and stiffness distribution 200 to a space-filling Turing pattern 220. In one example, the computing device transforms the orientation and stiffness distribution 200 to a space-filling Turing pattern 220 using a simulation of a reaction-diffusion equation. In some instances, in the reaction-diffusion simulation, anisotropic elastic properties obtained from the topology analysis are regarded as anisotropic diffusion properties. In some instances, once the computing device solves the reaction-diffusion equation, the computing device automatically generates the space-filling Turing pattern 220. Moreover, in some instances, the computing device can change a pitch width of the Turing pattern 220 by controlling the parameters of the reaction-diffusion equation and using the orientation and stiffness distribution 200.

At step 330, the method 300 includes creating a reinforcement 128 based on the Turing pattern 220. In some instances, a machine creates the reinforcement based on the Turing pattern 220. In other instances, a person creates the reinforcement based on the Turing pattern 220. At step 340, the method 300 includes applying the reinforcement 128 to the outer surface 104 of the inflatable 100. In some instances, a person applies the reinforcement to the outer surface 104. In other instances, a machine applies the reinforcement to the outer surface 104. The reinforcement 128 can be attached to the outer surface 104 in any suitable manner, for example, the reinforcement 128 is attached to the outer surface 104 by gluing, sewing, fabric-bonding, etc. The method 300 ends at step 350.

Referring now to FIGS. 4A-4D, in some arrangements, the inflatable 100 also includes jamming technology configured to improve the loading strength and/or bending capability of the inflation chamber 102. The jamming technology includes one or more jamming elements. When pressed together, the friction between jamming element(s) increases, causing the inflatable 100 to be rigid. When separated from each other, the friction between the jamming element(s) decreases, causing the inflatable 100 to be non-rigid. The jamming element(s) are located within one or more jamming chambers. The jamming chamber(s) are configured to press the jamming element(s) together to increase the friction between the jamming element(s) and cause the inflatable 100 to be rigid. The jamming chamber(s) are also configured to allow the jamming element(s) to be separated from each other to decrease the friction between the jamming element(s) and cause the inflatable 100 to be non-rigid. In some instances, the jamming chamber(s) are attached to the inflation chamber 102, for example, to the outer surface 104. In other instances, the jamming chamber(s) are unitarily formed with the inflation chamber 102. The inflatable 100 includes a suitable number of jamming element(s) and jamming chamber(s).

In one configuration, as shown, the inflatable 100 includes a tensile jamming chamber 400 located on the tensile side 120 and a compressive jamming chamber 410 located on the compressive side 122. In one example, the tensile jamming chamber 400 and/or the compressive jamming chamber 410 are separate inflation chambers 102 configured to be attached to the inflation chamber 102, as shown. However, in other arrangements, the tensile jamming chamber 400 and/or the compressive jamming chamber 410 are unitarily formed with the inflation chamber 102. For example, the inflation chamber 102, along with the tensile jamming chamber 400 and/or the compressive jamming chamber 410 can be formed from the same piece of material.

The tensile jamming chamber 400, in one example, includes jamming layers 420. In some arrangements, the jamming layers 420 are flat, thin pieces of material. In one example, the jamming layers 420 are segmented elastic fibrils, but the jamming layers 420 can be other suitable types of jamming layers 420, such as sheets of sandpaper, pieces of thread, etc. When the jamming layers 420 are pressed together (e.g., jammed), as described in further detail below, the jamming layers 420 are configured to cause the tensile jamming chamber 400 to become rigid. When the jamming layers 420 are not pressed together (e.g., unjammed), the tensile jamming chamber 400 may not be rigid.

The compressive jamming chamber 410, in one example, includes jamming particles 430. In some arrangements, the jamming particles 430 are small, substantially spherical pieces of material. In one example, the jamming particles 430 are coffee beans, but the jamming particles 430 can be other suitable types of jamming particles 430 such as plastic beads, gravel, rice, etc. When the jamming particles 430 are pressed together (e.g., jammed), as described in further detail below, the jamming particles 430 are configured to cause the compressive jamming chamber 410 to become rigid. When the jamming particles 430 are not pressed together (e.g., unjammed), the compressive jamming chamber 410 may not be rigid.

While FIGS. 4A-4D show the tensile jamming chamber 400 as having jamming layers 420 and the compressive jamming chamber 410 as having jamming particles 430, it should be understood that the tensile jamming chamber 400 is not limited to having jamming layers 420 and the compressive jamming chamber 410 is not limited to having jamming particles 430. In fact, the tensile jamming chamber 400 can have jamming particles 430 and the compressive jamming chamber 410 can have jamming layers 420. In some arrangements, moreover, the tensile jamming chamber 400 and/or the compressive jamming chamber 410 can each have both jamming layers 420 and jamming particles 430.

The jamming chamber(s) can include one or more jamming chamber inflation ports 114 fluidly connected to the jamming chamber(s). In one example, as shown in FIGS. 4A-4D, the tensile jamming chamber 400 includes a tensile jamming chamber inflation port 440 fluidly connected to the tensile jamming chamber 400 and configured to be connected to a tensile jamming chamber pump 630, shown in FIG. 6. The tensile jamming chamber pump 630 is operable to pump fluid into the tensile jamming chamber 400 through the tensile jamming chamber inflation port 440 to inflate the tensile jamming chamber 400 and is also operable to pump fluid out of the tensile jamming chamber 400 through the tensile jamming chamber inflation port 440 to deflate the tensile jamming chamber 400. Similarly, in one example, the compressive jamming chamber 410 can include a compressive jamming chamber inflation port 450 fluidly connected to the compressive jamming chamber 410 and configured to be connected to a compressive jamming chamber pump 640, shown in FIG. 6. The compressive jamming chamber pump 640 is operable to pump fluid into the compressive jamming chamber 410 through the compressive jamming chamber inflation port 450 to inflate the compressive jamming chamber 410 and is also operable to pump fluid out of the compressive jamming chamber 410 through the compressive jamming chamber inflation port 450 to deflate the compressive jamming chamber 410.

Figure 4A:
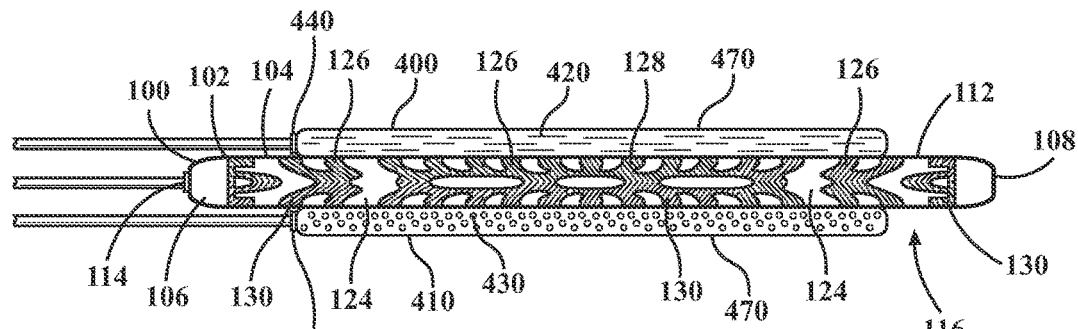
FIG. 4A illustrates an example of the inflatable of FIGS. 1A and 1B in an unbent configuration and including jamming chambers containing jamming elements.
Figure 4B:
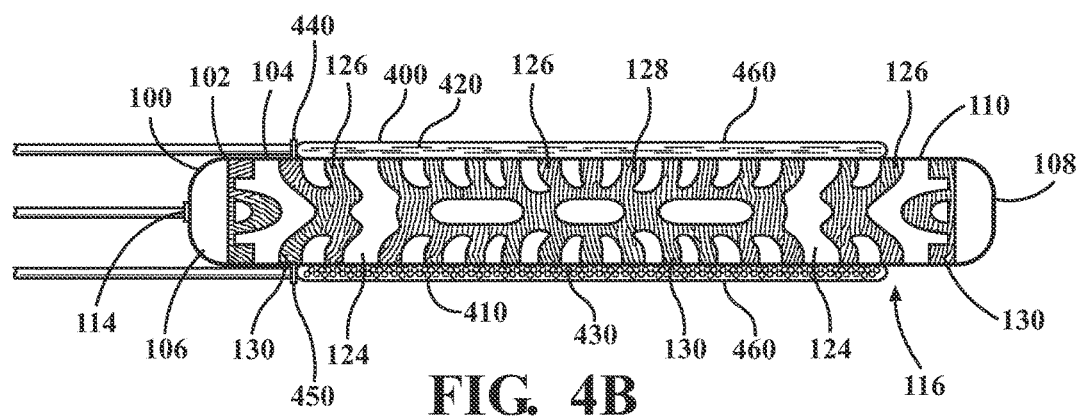
FIG. 4B illustrates an example of the inflatable of FIG. 4A.
Figures 4C, 4D:
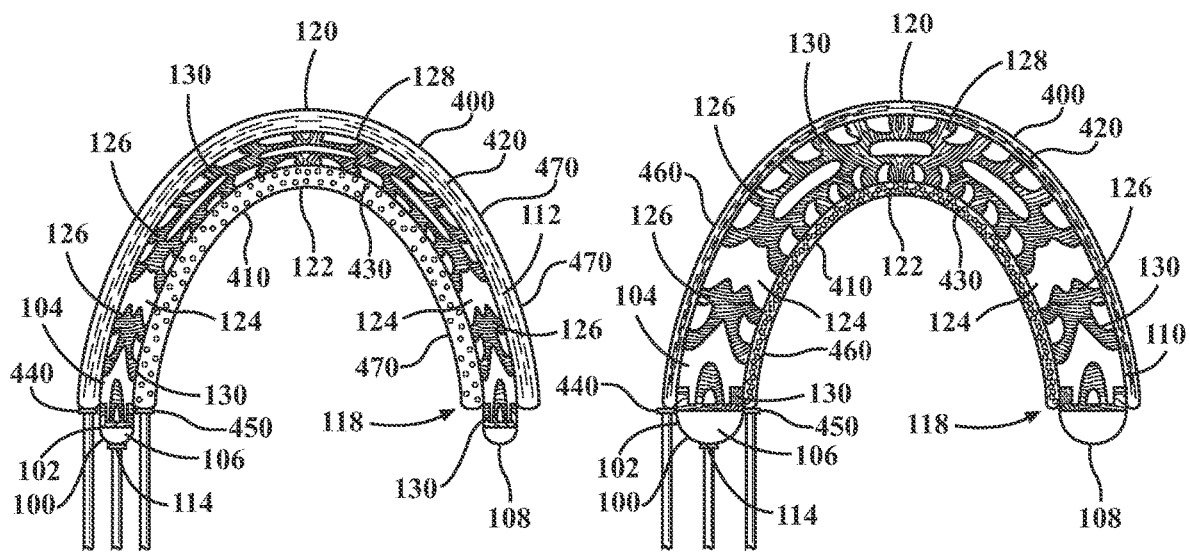
FIG. 4C illustrates an example of the inflatable of FIGS. 4A and 4B in a substantially bent configuration.
FIG. 4D illustrates an example of the inflatable of FIG. 4C, where the jamming chambers are substantially under vacuum, and the jamming elements are pressed.

In some arrangements, the jamming chamber(s) have a rigid state 460 as depicted in FIGS. 4B and 4D and a non-rigid state 470 as depicted in FIGS. 4A and 4C. In the rigid state 460, the jamming chamber pump(s) are operated to pump substantially all of the fluid out of the jamming chamber(s) (e.g., deflate the jamming chamber(s)), causing the jamming chamber(s) to press the jamming elements together to increase the friction between the jamming elements, thus causing the jamming chamber(s) to become rigid. Referring to the tensile jamming chamber 400, in the rigid state 460, the tensile jamming chamber pump 630 is operated to pump substantially all of the fluid out of the tensile jamming chamber 400 to cause the tensile jamming chamber 400 to be substantially under vacuum. When the tensile jamming chamber 400 is substantially under vacuum, the tensile jamming chamber 400 presses the jamming layers 420 together, and the friction between the jamming layers 420 is increased, thus causing the tensile jamming chamber 400 to become rigid. Referring to the compressive jamming chamber 410, in the rigid state 460, the compressive jamming chamber pump 640 is operated to pump substantially all of the fluid out of the compressive jamming chamber 410 to cause the compressive jamming chamber 410 to be substantially under vacuum. When the compressive jamming chamber 410 is substantially under vacuum, the compressive jamming chamber 410 presses the jamming particles 430 together, and the friction between the jamming particles 430 is increased, thus causing the compressive jamming chamber 410 to become rigid.

In the non-rigid state 470, the jamming chamber pump(s) are operated to pump fluid into the jamming chamber(s) (e.g., inflate the jamming chamber(s)) to cause the jamming elements to be separated to reduce the friction between the jamming elements, thus causing the jamming chamber(s) to become non-rigid. Referring to the tensile jamming chamber 400, in the non-rigid state 470, the tensile jamming chamber pump 630 is operated to pump fluid into the tensile jamming chamber 400 to cause the tensile jamming chamber 400 to not be under vacuum. When the tensile jamming chamber 400 is not under vacuum, the jamming layers 420 are separated and the friction between the jamming layers 420 is decreased, thus causing the tensile jamming chamber 400 to become non-rigid. Referring to the compressive jamming chamber 410, in the non-rigid state 470, the compressive jamming chamber pump 640 is operated to pump fluid into the compressive jamming chamber 410 to cause the compressive jamming chamber 410 to not be under vacuum. When the compressive jamming chamber 410 is not under vacuum, the jamming particles 430 are separated and the friction between the jamming particles 430 is decreased, thus causing the compressive jamming chamber 410 to become non-rigid.

In some arrangements, causing the tensile jamming chamber 400 and/or the compressive jamming chamber 410 to become rigid also causes the inflatable 100 as a whole to become rigid, thus improving the loading strength and/or bending capability of the inflation chamber 102. For example, when rigid and in the inflated state 110, the inflatable 100 may be able to support a higher load than when the inflatable 100 is non-rigid and in the inflated state 110. Similarly, causing the tensile jamming chamber 400 and/or the compressive jamming chamber 410 to become non-rigid also causes the inflatable 100 as a whole to become non-rigid. Referring now to FIGS. 4B and 4D, when the inflatable 100 is in the inflated state 110, the inflatable 100 can become rigid in the unbent configuration 116 as depicted in FIG. 4B or the bent configuration 118 as depicted in FIG. 4D. FIG. 4B shows the inflatable 100 in the inflated state 110, unbent configuration 116, and rigid state 460. FIG. 4D shows the inflatable 100 in the inflated state 110, bent configuration 118, and rigid state 460. Referring now to FIGS. 4A and 4C, when the inflatable 100 is in the deflated state 112, the inflatable 100 can become non-rigid in the unbent configuration 116 as depicted in FIG. 4A or the bent configuration 118 as depicted in FIG. 4C. FIG. 4A shows the inflatable 100 in the deflated state 112, unbent configuration 116, and non-rigid state 470. FIG. 4C shows the inflatable 100 in the deflated state 112, bent configuration 118, and non-rigid state 470.

As shown in FIGS. 4A-4D, the tensile jamming chamber pump 630 and the compressive jamming chamber pump 640 are separate pumps. In this way, the tensile jamming chamber 400 and the compressive jamming chamber 410 can be independently inflated and/or deflated. However, it should be understood that in some arrangements, the tensile jamming chamber pump 630 and the compressive jamming chamber pump 640 can be the same, unitary pump such that the tensile jamming chamber 400 and the compressive jamming chamber 410 can be simultaneously inflated and/or deflated. Together, the inflation chamber pump 620, the tensile jamming chamber pump 630, and/or the compressive jamming chamber pump 640 may form a pump system 610, shown in FIG. 6, for the inflatable 100.

Figure 5:
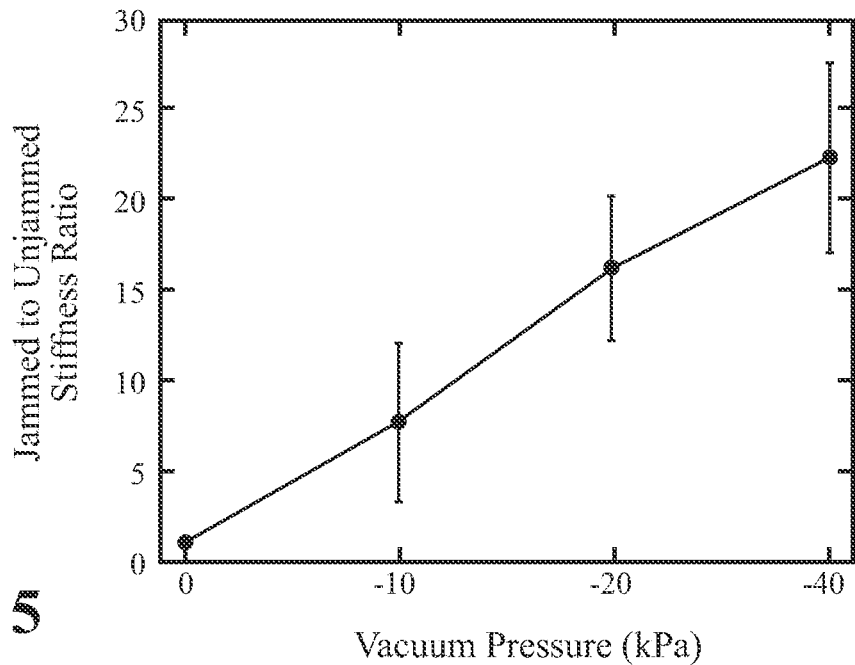
FIG. 5 illustrates a graph depicting a tensile stiffness ratio of the inflatable in a jammed configuration vs. an unjammed configuration as the pressure of the jamming chambers decreases.

When the tensile jamming chamber 400 and/or the compressive jamming chamber 410 are rigid, the tensile jamming element and/or the compressive jamming element may have a jammed stiffness value. Similarly, when the tensile jamming chamber 400 and/or the compressive jamming chamber 410 are not rigid, the tensile jamming element and/or the compressive jamming element may have an unjammed stiffness value. FIG. 5 shows an example of the jammed-to-unjammed stiffness ratio of the inflatable 100 as the vacuum pressure in the jamming chamber(s) decreases. In some arrangements, when the vacuum pressure is 0 kPa, the stiffness ratio is 0. When the vacuum pressure is −10 kPa, the stiffness ratio may be from about 3 to about 13. In one example, when the vacuum pressure is −10 kPa, the stiffness ratio is about 8. When the vacuum pressure is −20 kPa, the stiffness ratio may be from about 12 to about 20. In one example, when the vacuum pressure is −20 kPa, the stiffness ratio is about 16. When the vacuum pressure is −40 kPa, the stiffness ratio may be from about 17 to about 27. In one example, when the vacuum pressure is −40 kPa, the stiffness ratio is about 23.

Figure 6:
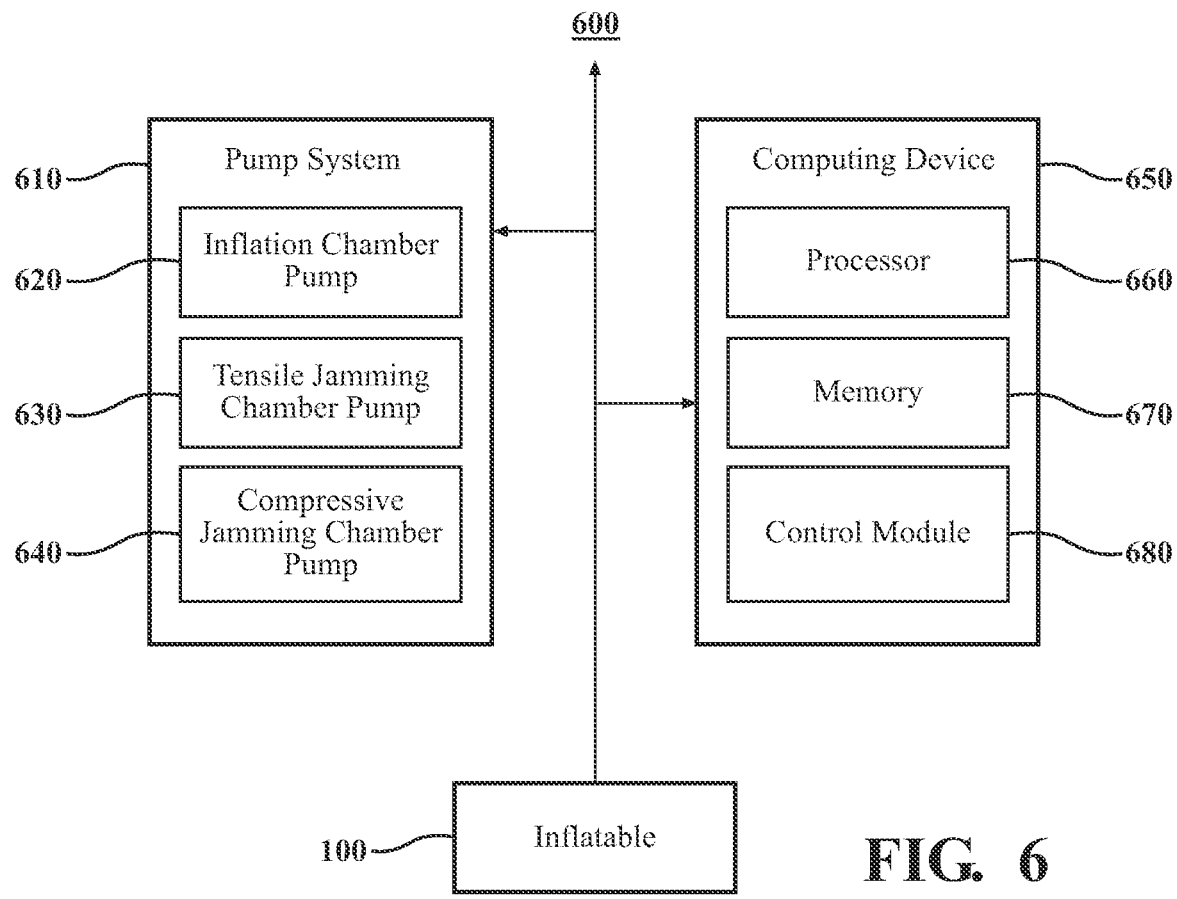
FIG. 6 illustrates an inflatable actuation system for operating an inflatable.

In one embodiment, the inflatable 100 can be a part of an inflatable actuation system 600. Referring to FIG. 6, the inflatable actuation system 600 includes the inflatable 100 and a pump system 610, as mentioned above. The pump system 610 includes the inflation chamber pump 620, the tensile jamming chamber pump 630, and/or the compressive jamming chamber pump 640. The inflatable actuation system 600 also includes a processor 660, a memory 670, and a control module 680 to which the pump system 610 is communicatively connected. The processor 660, the memory 670, and the control module 680 together serve as a computing device 650 whose control module 680 is employable to orchestrate the operation of the inflatable actuation system 600, in whole or in part. Specifically, the control module 680 operates the inflatable actuation system 600 based on one or more signals received by the processor 660.

The control module 680 may be a global control module. Relatedly, as part of a central control system, the inflatable actuation system 600 may include a global control unit (GCU) to which the control module 680 is communicatively connected. Alternatively, the control module 680 may be a global control module. Relatedly, as part of a central control system, the inflatable actuation system 600 may include a global control unit (GCU) to which the control module 680 belongs. Although the inflatable actuation system 600 as shown includes one control module 680, it will be understood that this disclosure is applicable in principal to otherwise similar inflatable actuation systems including multiple control modules. Moreover, although the control module 680 is shown as part of the inflatable actuation system 600, it will be understood that the control module 680 may be located separately from the inflatable actuation system 600. The control module 680 may be implemented as computer-readable program code that, when executed by the processor 660, executes one or more of the processes described herein. Such computer-readable program code may be stored in the memory 670. The control module 680 may be part of the processor 660 or may be communicatively connected to the processor 660.

The processor 660 may be configured to execute any of the processes described herein or any form of instructions to carry out such processes or cause such processes to be performed. The processor 660 may be implemented with one or more general-purpose or special-purpose processor. Examples of suitable processors include microprocessors, microcontrollers, digital signal processors, or other forms of circuitry that execute software. Other examples of suitable processors include, without limitation, central processing units (CPUs), array processors, vector processors, digital signal processors (DSPs), field-programmable gate arrays (FPGAs), programmable logic arrays (PLAs), application-specific integrated circuits (ASICs), programmable logic circuitry, or controllers. The processor 660 may include at least one hardware circuit (e.g., an integrated circuit) configured to carry out instructions contained in program code. In arrangements where there are multiple processors, the processors may work independently from each other or in combination with one another. Moreover, although the processor 660 is shown as part of the inflatable actuation system 600, it will be understood that the processor 660 may be located separately from the inflatable actuation system 600. Examples of suitable memory 670 include random access memory (RAM), flash memory, read-only memory (ROM), programmable read-only memory (RPOM), erasable programmable read-only memory (EPROM), electrically erasable programmable read-only memory (EEPROM), registers, magnetic disks, optical disks, hard drives, or any other suitable storage medium, or any combination of these. The memory 670 includes stored instructions in program code. Such instructions are executable by the processor 660 or the control module 680. The memory 670 may be part of the processor 660 or the control module 680 or may be communicatively connected to the processor 660. Generally speaking, the control module 680 includes instructions that may be executed by the processor 660.

The inflatable actuation system 600 is configured to operate the pump system 610 responsive to one or more signals. The signals can include an inflation signal, a deflation signal, a rigidification signal, and a non-rigidification signal. The inflation signal causes the inflatable actuation system 600 to inflate the inflation chamber 102. The deflation signal causes the inflatable actuation system 600 to deflate the inflation chamber 102. The rigidification signal causes the inflatable actuation system 600 to cause the tensile jamming chamber 400 and/or the compressive jamming chamber 410 to become rigid, such that the inflatable 100 is rigid. The non-rigidification signal causes the inflatable actuation system 600 to cause the tensile jamming chamber 400 and the compressive jamming chamber 410 to become non-rigid such that the inflatable 100 is non-rigid.

When the processor 660 receives the inflation signal, the processor 660 is configured to operate the inflation pump to inflate the inflation chamber 102 and operate the tensile jamming chamber 400 inflation pump to inflate the tensile jamming chamber 400. When the processor 660 receives the deflation signal, the processor 660 is configured to operate the inflation pump to deflate the inflation chamber 102 and operate the tensile jamming chamber 400 inflation pump to deflate the tensile jamming chamber 400. When the processor 660 receives the rigidification signal, the processor 660 is configured to operate the tensile jamming chamber 400 inflation pump to cause the tensile jamming chamber 400 to be substantially under vacuum and/or operate the compressive jamming chamber 410 inflation pump to cause the compressive jamming chamber 410 to be substantially under vacuum. When the processor 660 receives the non-rigidification signal, the processor 660 is configured to operate the tensile jamming chamber 400 inflation pump to inflate the tensile jamming chamber 400 and/or operate the compressive jamming chamber 410 inflation pump to inflate the compressive jamming chamber 410.

Figure 7:
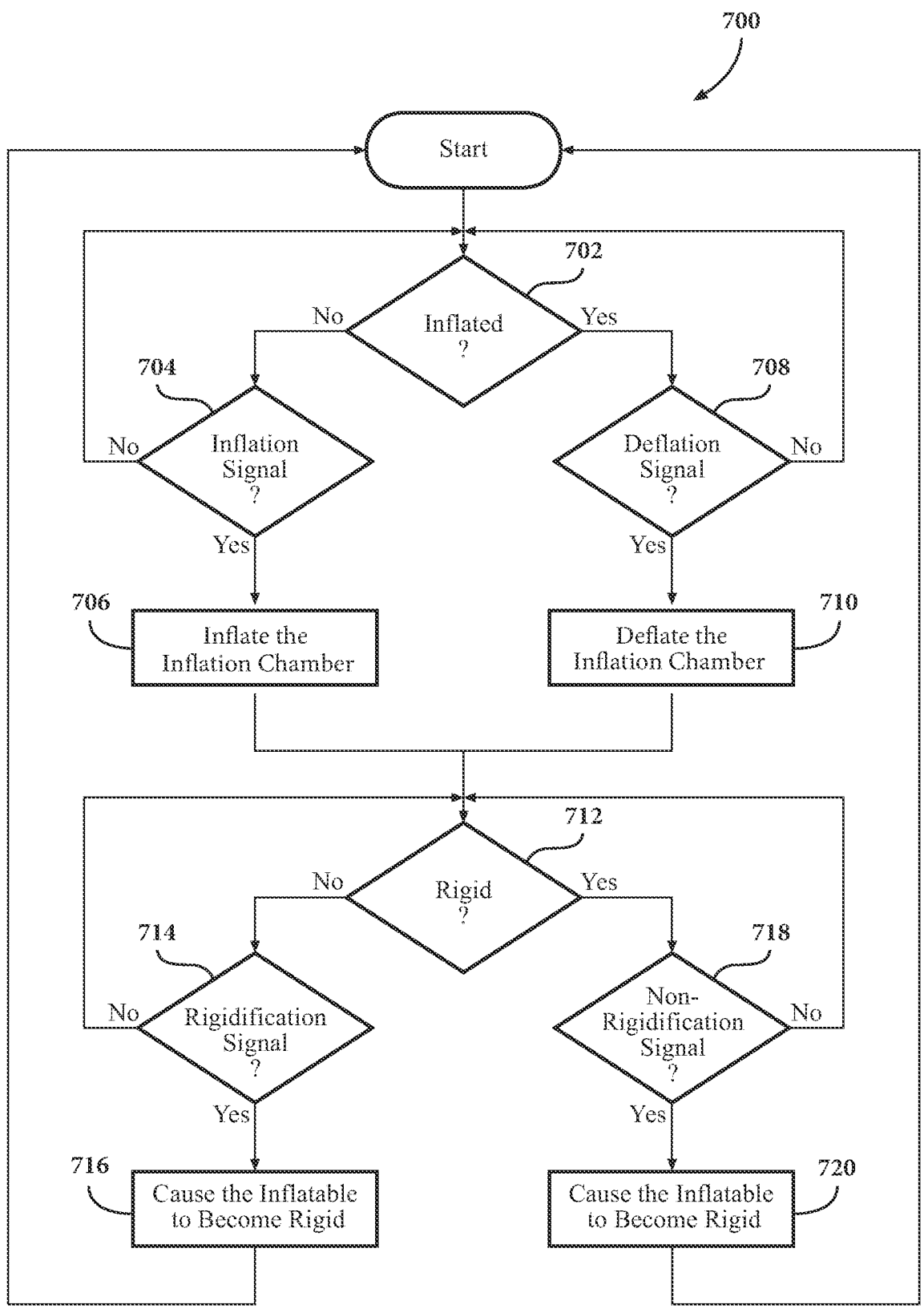
FIG. 7 illustrates a method of operating the inflatable actuation system.

Referring now to FIG. 7, an example of a method 700 of operating the inflatable actuation system 600 is shown. The computing device 650 may be configured to execute the method 700. At step 702, in one approach, the computing device 650 determines whether the inflation chamber 102 is in the inflated state 110. For example, the computing device 650 may determine if the inflation chamber 102 is substantially full of fluid. If the inflation chamber 102 is not in the inflated state 110 (e.g., the inflatable 100 is in the deflated state 112 and not substantially full of fluid), the method 700 may proceed to step 704. At step 704, the computing device 650 may determine whether an inflation signal has been received. The inflation signal may be a signal received by the processor 660 instructing the control module 680 to inflate the inflation chamber 102. If the inflation signal is received, the method 700 may proceed to step 706. At step 706, the computing device 650 inflates the inflation chamber 102. For example, the computing device 650 operates the inflation chamber pump 620 to pump fluid into the inflation chamber 102. If the inflation signal is not received, the method 700 can return to step 702. If the inflatable 100 is in the inflated state 110, the method 700 may proceed to step 708. At step 708, the computing device 650 determines whether a deflation signal has been received. The deflation signal may be a signal received by the processor 660 instructing the control module 680 to deflate the inflation chamber 102. If the deflation signal is received, the method 700 may proceed to step 710. At step 710, the computing device 650 deflates the inflation chamber 102. For example, the computing device 650 operates the inflation chamber pump 620 to pump fluid out of the inflation chamber 102. If the deflation signal is not received, the method 700 may return to step 702.

The method 700 may proceed from step 706 or 710 to step 712. At step 712, in one approach, the computing device 650 determines whether the inflatable 100 is rigid (e.g., the inflatable 100 is in the rigid state 460). This can involve determining whether the tensile jamming chamber 400 and/or the compressive jamming chamber 410 are substantially under vacuum such that the jamming element(s) are pressed together and thus rigid. If the inflatable 100 is not rigid, the method 700 may proceed to step 714. At step 714, the computing device 650 includes determining whether a rigidification signal has been received. The rigidification signal may be a signal received by the processor 660 instructing the control module 680 to cause the inflatable 100 to become rigid. If the rigidification signal has been received, the method 700 may proceed to step 716. At step 716, the computing device 650 causes the inflatable 100 to become rigid. For example, when received by the processor 660, the rigidification signal can instruct the control module 680 to operate the pump system 610 to cause the tensile jamming chamber 400 and/or the compressive jamming chamber 410 to become substantially under vacuum, thereby pressing the jamming element(s) together to cause the inflatable 100 to become rigid. The method 700 may then return to the start. If the rigidification signal has not been received, the method 700 may return to step 712.

If the inflatable 100 is rigid, the method 700 may proceed to step 718. At step 718, the computing device 650 determines whether a non-rigidification signal has been received. The non-rigidification signal may be a signal received by the processor 660 instructing the control module 680 to cause the inflatable 100 to become non-rigid. If the non-rigidification signal has been received, the method 700 may proceed to step 720. At step 720, the computing device 650 causes the inflatable 100 to become non-rigid. For example, when received by the processor 660, the non-rigidification signal can instruct the control module 680 to operate the pump system 610 to inflate the tensile jamming chamber 400 and the compressive jamming chamber 410, thereby separating the jamming element(s) to cause the inflatable 100 to become non-rigid. The method 700 may then return to the start. If the non-rigidification signal has not been received, the method 700 may return to step 712.

Figure 8A:
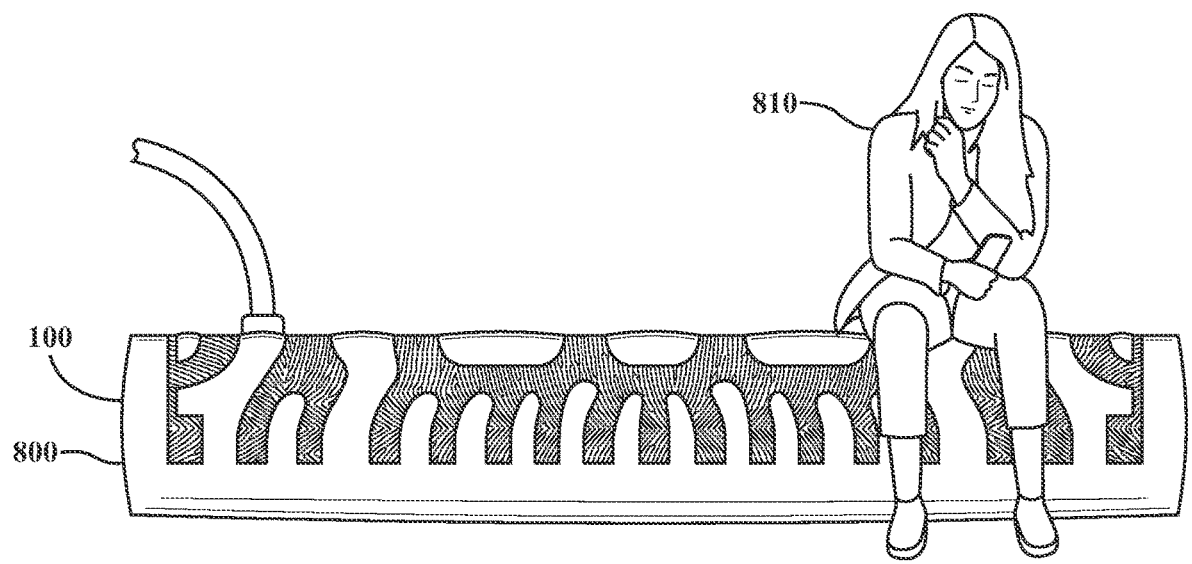
FIG. 8A illustrates an example of the inflatable configured as a bench seat.
Figure 8B:
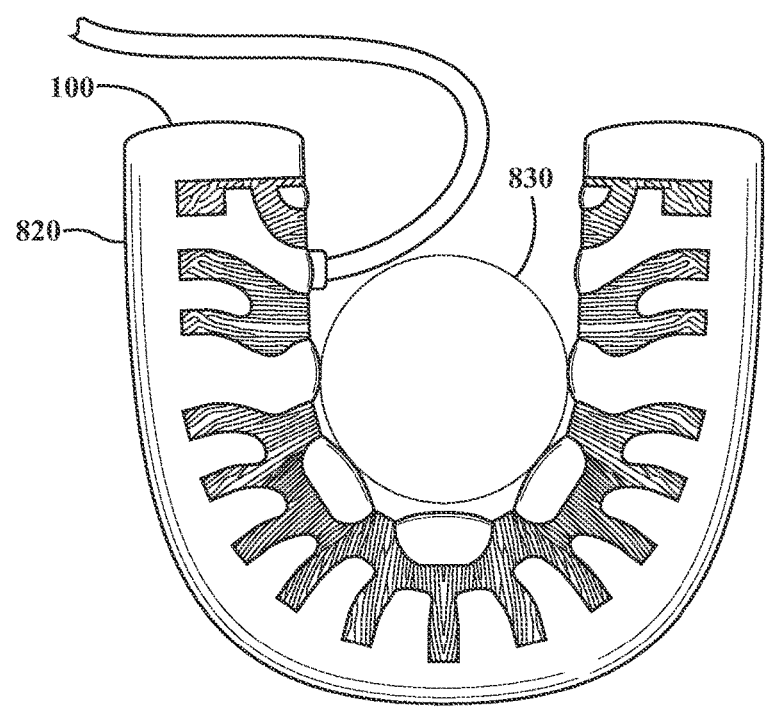
FIG. 8B illustrates an example of the inflatable configured as a soft robotic arm.

The inflatable 100 and/or the inflatable actuation system 600 can be used in a variety of applications. For example, as shown in FIG. 8A, the inflatable 100 can be used as an inflatable 100 bench 800. This may be advantageous because, in the deflated and non-rigid state 470, the bench 800 can be easily flattened, folded, or otherwise compacted for storage, and, in the inflated and rigid state 460, the bench 800 can be used as furniture to support a person 810 sitting on the bench 800. In another example, as shown in FIG. 8B, the inflatable 100 can be used as a soft robotic arm 820. This may be advantageous because, in the deflated and non-rigid state 470, the arm 820 can be easily flattened, folded, or otherwise compacted for storage, and, in the inflated and rigid state 460, the arm 820 can be used to grab an item 830, such as a ball.

The arrangements described herein have the benefit of improving the loading strength and/or the bending capability of an inflatable. In some arrangements, as a result of an improved loading strength, the inflatable is configured to support a heavier load when used as a bench seat. In other arrangements, as a result of an improved bending capability, the inflatable is configured to grab larger and/or heavier items when used as a soft robotic arm. However, it should be understood that the applications described herein are not limiting. The inflatable can be used in other suitable applications.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-8B, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, the term "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An inflatable, comprising:
   an inflation chamber, the inflation chamber having an elongated body and an outer surface, the inflation chamber configured to be inflated from a deflated state to an inflated state, and the inflation chamber being loadable and bendable in the inflated state; and
   a reinforcement having reinforcement sections corresponding to high-stress regions of the outer surface when the inflation chamber is in the inflated state, the reinforcement attached to the outer surface, and the reinforcement configured to improve at least one of a loading strength and a bending capability of the inflation chamber when the reinforcement sections are placed on the high-stress regions of the outer surface, wherein the reinforcement is shaped according to a Turing pattern that is based on the high-stress regions of the outer surface.

2. The inflatable of claim 1, wherein the Turing pattern is based on topology analysis of the outer surface that includes high-stress regions, and wherein the Turing pattern corresponds with an orientation and stiffness distribution of at least one material of the reinforcement sections such that the reinforcement alleviates stress in the high-stress regions.

3. The inflatable of claim 2, wherein the at least one material is fabric.

4. The inflatable of claim 2, wherein a pitch width of the Turing pattern is based, at least in part, on the orientation and stiffness distribution.

5. The inflatable of claim 1, wherein the inflation chamber is bendable from a substantially unbent configuration to a generally bent configuration in which the inflatable forms a U-shape, and wherein, in the bent configuration, the inflation chamber has a tensile side that is stretched and a compressive side that is compressed.

6. The inflatable of claim 5, further comprising:
   a tensile jamming chamber for the tensile side including a tensile jamming element that causes the tensile jamming chamber to become rigid when the tensile jamming chamber is substantially under vacuum, thereby improving at least one of the loading strength and the bending capability of the inflation chamber.

7. The inflatable of claim 6, wherein the tensile jamming element includes jamming layers, and wherein, when the tensile jamming chamber is substantially under vacuum, the jamming chamber presses together the jamming layers, thereby increasing the friction between the jamming layers and causing the tensile jamming chamber to become rigid.

8. The inflatable of claim 5, further comprising:
   a compressive jamming chamber for the compressive side including a compressive jamming element that causes the compressive jamming chamber to become rigid when the compressive jamming chamber is substantially under vacuum, thereby improving at least one of the loading strength and the bending capability of the inflation chamber.

9. The inflatable of claim 8, wherein the compressive jamming element includes jamming particles, and wherein, when the compressive jamming chamber is substantially under vacuum, the compressive jamming chamber presses together the jamming particles, thereby increasing the friction between the jamming particles and causing the compressive jamming chamber to become rigid.

10. An inflatable, comprising:
    an inflation chamber, the inflation chamber having an elongated body and an outer surface, the inflation chamber configured to be inflated from a deflated state to an inflated state, and the inflation chamber being loadable and bendable in the inflated state; and
    a fabric reinforcement attached to the outer surface, the fabric reinforcement shaped according to a Turing pattern that is based on high-stress regions of the outer surface when the inflation chamber is in the inflated state, the reinforcement having reinforcement sections corresponding to the high-stress regions, and the reinforcement configured to improve at least one of a loading strength and a bending capability of the inflation chamber when the reinforcement sections are placed on the high-stress regions of the outer surface, wherein the Turing pattern is based on topology analysis of the outer surface, and wherein the Turing pattern corresponds with an orientation and stiffness distribution of at least one material of the reinforcement sections such that the reinforcement alleviates stress in the high-stress regions.

11. The inflatable of claim 10, wherein a pitch width of the Turing pattern is based, at least in part, on the orientation and stiffness distribution.

12. The inflatable of claim 10, wherein the inflation chamber is bendable from a substantially unbent configuration to a generally bent configuration in which the inflatable forms a U-shape, and wherein, in the bent configuration, the inflation chamber has a tensile side that is stretched and a compressive side that is compressed.

13. The inflatable of claim 12, further comprising:
a tensile jamming chamber for the tensile side including a tensile jamming element that causes the tensile jamming chamber to become rigid when the tensile jamming chamber is substantially under vacuum, thereby improving at least one of the loading strength and the bending capability of the inflation chamber.

14. The inflatable of claim 13, wherein the tensile jamming element includes jamming layers, and wherein, when the tensile jamming chamber is substantially under vacuum, the jamming chamber presses together the jamming layers, thereby increasing the friction between the jamming layers and causing the tensile jamming chamber to become rigid.

15. The inflatable of claim 12, further comprising:
a compressive jamming chamber for the compressive side including a compressive jamming element that causes the compressive jamming chamber to become rigid when the compressive jamming chamber is substantially under vacuum, thereby improving at least one of the loading strength and the bending capability of the inflation chamber.

16. The inflatable of claim 15, wherein the compressive jamming element includes jamming particles, and wherein, when the compressive jamming chamber is substantially under vacuum, the compressive jamming chamber presses together the jamming particles, thereby increasing the friction between the jamming particles and causing the compressive jamming chamber to become rigid.

17. An inflatable, comprising:
an inflation chamber, the inflation chamber having an elongated body and an outer surface, the inflation chamber configured to be inflated from a deflated state to an inflated state, the inflation chamber being loadable and bendable in the inflated state, and the inflation chamber being bendable from a substantially unbent configuration to a generally bent configuration in which the inflatable forms a U-shape, wherein, in the bent configuration, the inflation chamber has a tensile side that is stretched and a compressive side that is compressed;
a fabric reinforcement attached to the outer surface, the fabric reinforcement shaped according to a Turing pattern that is based on high-stress regions of the outer surface when the inflation chamber is in the inflated state, the reinforcement having reinforcement sections corresponding to the high-stress regions, and the reinforcement configured to improve at least one of a loading strength and a bending capability of the inflation chamber when the reinforcement sections are placed on the high-stress regions of the outer surface, wherein the Turing pattern is based on topology analysis of the outer surface, and wherein the Turing pattern corresponds with an orientation and stiffness distribution of at least one material of the reinforcement sections such that the reinforcement alleviates stress in the high-stress regions; and
a jamming element for at least one of the tensile side and the compressive side, the jamming element configured to improve at least one of the loading strength and the bending capability of the inflation chamber.

18. The inflatable of claim 17, wherein a pitch width of the Turing pattern is based, at least in part, on the orientation and stiffness distribution.

19. The inflatable of claim 17, further comprising:
a tensile jamming chamber for the tensile side, wherein the jamming element includes jamming layers located within the tensile jamming chamber, and wherein, when the tensile jamming chamber is substantially under vacuum, the tensile jamming chamber presses together the jamming layers, thereby increasing the friction between the jamming layers and causing the tensile jamming chamber to become rigid, thereby improving at least one of the loading strength and the bending capability of the inflation chamber.

20. The inflatable of claim 17, further comprising:
a compressive jamming chamber for the compressive side, wherein the jamming element includes jamming particles located within the compressive jamming chamber, and wherein, when the compressive jamming chamber is substantially under vacuum, the compressive jamming chamber presses together the jamming particles, thereby increasing the friction between the jamming particles and causing the compressive jamming chamber to become rigid, thereby improving at least one of the loading strength and the bending capability of the inflation chamber.

* * * * *